United States Patent [19]

Sturm

[11] 3,773,967

[45] Nov. 20, 1973

[54] REACTION DAMPER FOR OVERHEAD ELECTRICAL TRANSMISSION LINES

[75] Inventor: Rolland G. Sturm, Huntsville, Ala.

[73] Assignee: Sturm Stress, Inc., Denver, Colo.

[22] Filed: Mar. 3, 1972

[21] Appl. No.: 231,496

[52] U.S. Cl. .................. 174/42, 174/127, 174/144
[51] Int. Cl. .................. H02g 7/14, H02t 19/02
[58] Field of Search .................. 174/42, 73 R, 127, 174/144

[56] References Cited
UNITED STATES PATENTS

| | | | |
|---|---|---|---|
| 1,766,995 | 6/1930 | Hofmann | 174/42 |
| 1,972,616 | 9/1934 | Austin | 174/42 |
| 2,789,154 | 4/1957 | Peterson | 174/127 X |
| 2,969,416 | 1/1961 | McGavern | 174/42 |
| 3,046,327 | 7/1962 | Harmon | 174/127 X |
| 3,179,740 | 4/1965 | Schlein | 174/127 |
| 3,478,160 | 11/1969 | Reed | 174/42 |

Primary Examiner—Laramie E. Askin
Attorney—Edward Taylor Newton et al.

[57] ABSTRACT

A corona and vibration suppressor in the form of a hollow metal spherical body supported on an electrical cable for limited movement in any direction to reflect sensed vibrations back along the line out of phase with the vibrations caused by the wind and thus suppress the vibrations in the cable. The suppressor is formed by two opposed hemispherical shells joined at their planar edges and secured closed by diametrically opposed detents. Semicircular recessed portions at the abutting edges of the shells define diametrically opposed holes, through which the cable passes and a single torsion bar, having $x$, $y$ and $z$ components, mounts the body on the cable. Two embodiments of the suppressor are shown, one having a bolted clamp for affixing the torsion bar to the cable and the other having an over-the-center clamp.

16 Claims, 7 Drawing Figures

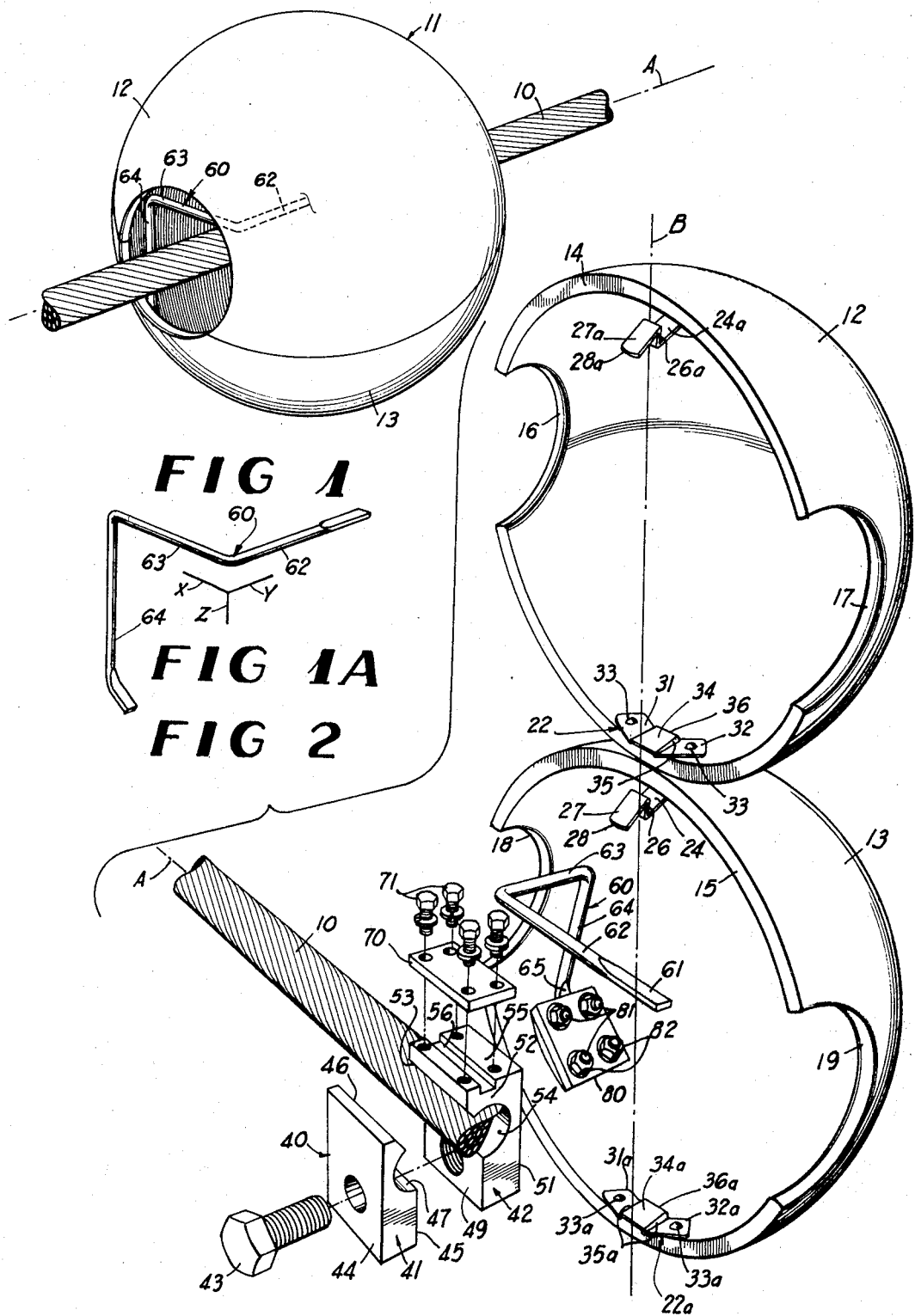

REACTION DAMPER FOR OVERHEAD ELECTRICAL TRANSMISSION LINES

SUMMARY OF INVENTION

The invention relates to a reaction damper for overhead electrical tranmission lines and is more particularly concerned with a corona and vibration suppressor which has particular utility in association with high voltage electrical transmission lines, telephone cables or the like.

On high voltage lines, considerable energy may be lost through corona discharge. This discharge seriously disrupts radio and television reception. The corona discharge also causes "flash-over" at supporting clamps, often resulting in severe damage to the supporting clamps and insulator strings. Such energy loss, radio interference and "flash-over" can be suppressed by the device of the present invention.

On outdoor lines which are suspended from point to point, such as electrical transmission lines between towers, various wind velocities set up aeolian vibrations of various frequencies in the lines. These oscillatory mechanical waves cause, among other effects, cyclic stresses at the cable support points. These cyclic stresses result eventually in accumulated metal fatigue damage to the cable. Frequent cable or insulation failure is attributed to this cause even in the presence of all known dampers or other vibration suppressing devices heretofore used. The damper herein described will minimize these effects because it has a capability of 6° of motion relative to the cable. No other damper known to me has the capability of more than three degrees of motion. It reflects vibrations, out of phase, back along the cable.

It is an object of the invention, therefore, to provide a device of the type described which offers, when mounted on a cable, a more complete damping effect over a wide spectrum of vibration frequencies than those utilized in the art.

Another object of the invention is to provide an inexpensive yet durable and efficient device of the type described which will simultaneously suppress both corona losses and vibration in an electrical cable suspended between two points.

Another object of the present invention is to provide a corona and vibration suppressor which, when functioning as a vibration suppressor, may readily move in any direction, including any linear direction and/or any rotary direction, so as to absorb various types of vibrations imparted to a suspended increment of cable.

It is a further object of the invention to provide a device of the type described which is effective to suppress vibrations of electrical transmission lines and the like, caused by external effects, such as wind, and to additionally function to suppress losses from corona discharge effects and thereby prevent radio frequency interference.

It is yet another object of the invention to provide an arrangement that is simple in construction and easily installed, even on "hot" electrical transmission lines.

It is another object of this invention to provide intrinsic corona shielding to the vibration mechanism.

These and other objects, features and advantages of the invention will become apparent in the course of the following description and from an examination of the associated drawings.

DESCRIPTION OF DRAWINGS

FIG. 1 is a perspective view of a corona and vibration suppressor or reaction damper constructed in accordance with the present invention, the suppressor being mounted for limited movement in any direction on a cable;

FIG. 1A is a diagrammatic illustrtation of the torsion bar of the corona and vibration suppressor or reaction damper showing the six degrees of movement of the suppressor or damper with respect to the cable;

FIG. 2 is an exploded perspective view of the reaction damper illustrated in FIG. 1;

DETAILED DESCRIPTION

Figure 3:
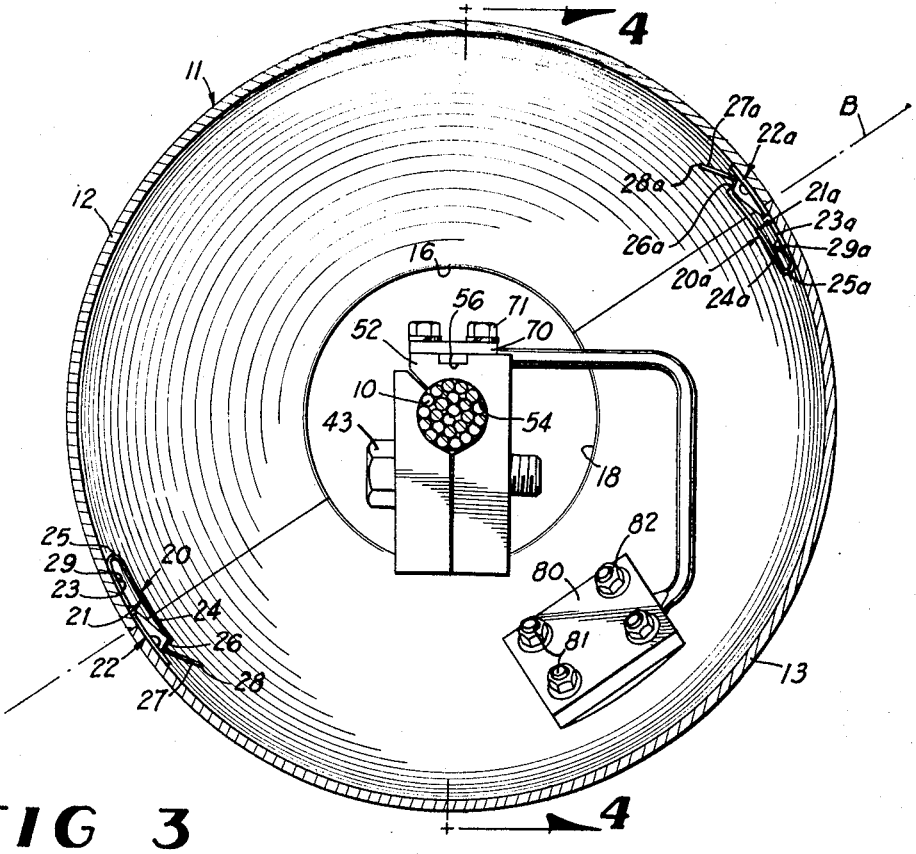
FIG. 3 is a vertical sectional view of the corona and vibration suppressor or reaction damper and cable shown in FIG. 1.
Figure 4:
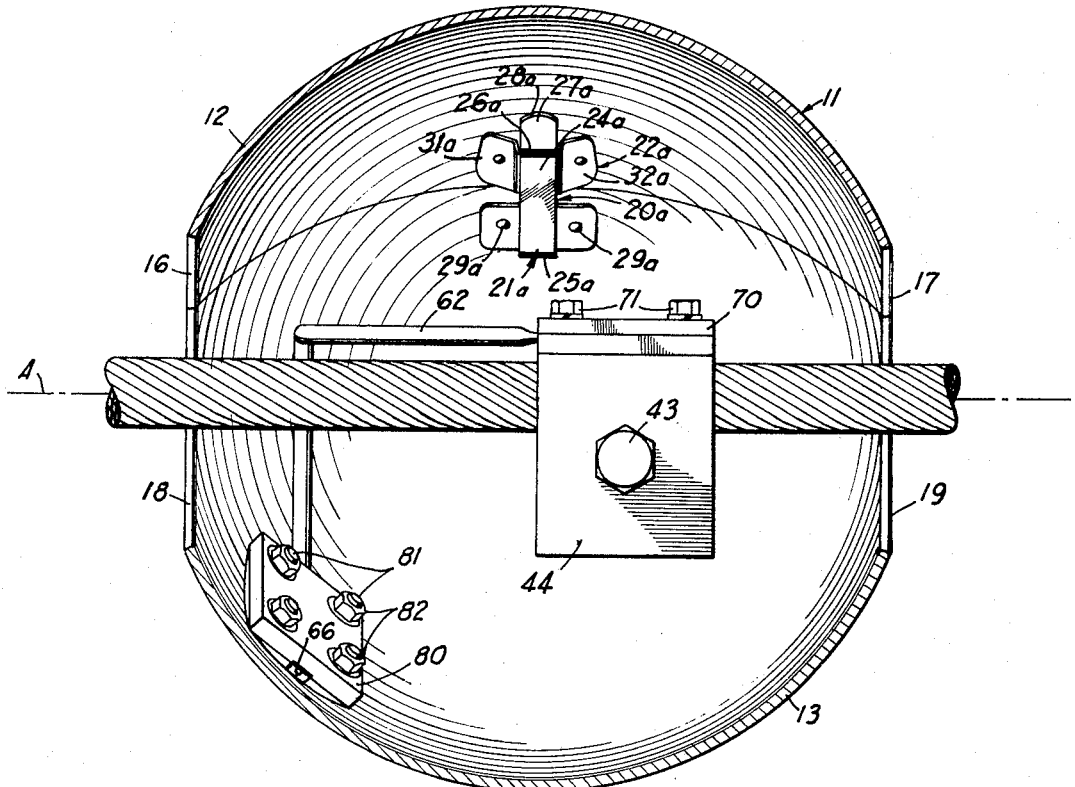
FIG. 4 is a vertical sectional view taken substantially along lines 4—4 in FIG. 3.

Referring now in detail to the embodiments chosen for the purpose of illustrating the present invention, numeral 10, in FIGS. 1-4, denotes a cable, a high voltage electrical transmission line, a telephone cable, or the like. Under normal conditions, such a cable is suspended between two spaced points such as a pair of telephone poles or a pair of towers (not shown). Under such conditions, wind will cause various types of vibrations by means of which the cable will be caused to move in an axial direction or in a radial direction up or down, sidewise or any combination thereof. Usually such vibrations, however, are harmonic or cyclic in nature.

The suppressor or reaction damper of the present invention is designed to prevent or to reduce these vibrations, while at the same time reducing the corona loss on cable 10, in the event that it is a high voltage cable. The suppressor or reaction damper of FIGS. 1-4 is for reacting, out of phase, with vibrations in the cable and for reflecting such reactions along the cable 10 to crest a damping effect on the subsequent vibrations in the cable 10. The suppressor or damper includes a hollow spherical thin-walled metal body, denoted generally by numeral 11, through which the cable 10 passes. While the preferred shape of the suppressor or body 11 is global or spherical in form, it will be understood that the body of the suppressor or damper may be spheroidal, ellipsoidal, oval or any other form having a relatively smooth curvature in all directions of its surface.

The body 11 is of uniform thickness and has a smooth substantially continuous outer surface. In more detail, the body 11 comprises a pair of opposed, complementary, approximately hemispherical, thin-walled, metal shells 12 and 13, which abut each other along their planar inner edges 14 and 15. The shell 12 is provided with two diametrically opposed, complementary, semicircular open slots or recesses 16 and 17 at its edge 14. In like manner, shell 13 is provided with two such diametrically opposed open slots or recesses 18 and 19 which, when shells 12 and 13 are in registry, i.e., closed with edges 14 and 15 contiguous, form a pair of diametrically opposed circular openings. Thus, when the two shells 12 and 13 are disposed in abutting relationship, the recesses 16 and 17 of the shell 12 are in apposition to the recesses 18 and 19, respectively, of the shell 13 so as to define the aligned circular openings along a common horizontal first axis (seen in FIGS. 1 and 4) passing through the center of the spherical body 11. The cable 10 can readily pass through the center of the spherical body 11 without coming into physical contact with either shell 12 or 13. Furthermore, if the shells 12 and 13 remain in abutting relationship, there is no way to remove the body 11 from a cable 10 suspended between two points (not shown).

For retaining the shells 12 and 13 in abutting relationship, with their edges 14 and 15 in contiguous relationship, there is provided a pair of opposed detent members, denoted generally by the numbers 20 and 20a in FIG. 3. The detent member 20 includes a spring latch 21 and a camming lug 22, disposed respectively on the inside surfaces of shells 12 and 13. In like manner, the detent 20a includes a spring latch 21a and a camming lug 22a.

The detents 20 and 20a are disposed in diametrically opposed relationship and along an axis B perpendicular to the axis A of the holes defined by the apertures 16, 18, 17 and 19.

In more detail, the spring latch 21 includes a T-shaped flat sheet metal leaf spring, the tongue of which is bent in a U-shape to form, with the transverse part of the tongue, a shank 24 joined by a U-shaped web 25. The shank 24 projects over and beyond the end of the base 23 and is bent downwardly at its distal end to define a shoulder member 26, which is disposed at least perpendicular to or at an acute angle to the shank 24. A camming finger 27 projects at an acute angle from the free end of the shoulder 26, so as to extend across the plane of the surface of the shank 24. The finger 27 terminates in a rounded end 28. The base 23 is, thus, substantially wider than the shank 24 and is secured to the inside surface of the shell 12 by a pair of bolts or screws, denoted by numeral 29. The shank 24 is of such a length that it projects beyond the edge 14 of the shell so as to overlie the camming lug 22 when the shell 13 is brought into registry with shell 12.

The camming lug 22 is a sheet metal member which is bent at its central portion to form a pair of oppositely extending wing bases 31 and 32, in spaced relationship to each other and secured respectively to the inside surface of shell 13 by bolts or screws 33. The central portion of lug 22, between the wing bases 31 and 32 forms a camming plate 34 which is supported by the sideplates 35 projecting from the inner edges of the bases 31 and 32, respectively. Thus, the plate 34 is disposed in off-set inclined relationship to the bases 31 and 32 and presents an inwardly inclined camming surface over against which the finger 27 and shoulder 26 ride as the shells 12 and 13 are brought into registry. As the shells 12 and 13 approach their abutting contiguous relationships, the shoulder 26 passes beyond the surface of plate 34 and is spring-urged into latching engagement with the back edge 36 of plate 34. In such relationship, the detent 20 retains the shells 12 and 13 in registry so as to produce the uniform diameter spherical globe or body 11.

In like manner, the leaf spring 21a includes a base 23a and a shank 24a joined by a U-shaped web 25a, the shank 24a being provided with a shoulder member 26a and a camming finger 27a with a rounded end 28a. Bolts 29a retain the base 23a against the inside surface of the shell 13.

Also, the lug 22a includes a pair of bases 31a and 32a retained in place by bolts 33a and supporting therebetween a camming plate 34a joined to the bases 31a and 32a by side plates 35a. The camming plate 34a is provided with a rear edge 36a which cooperates with the shoulder 26a to latch the shells 12 and 13 together.

In the preferred embodiment of FIGS. 1–4, a clamp denoted generally by numeral 40, an orthogonal torsion bar denoted by numeral 60 and an anchoring block denoted by numeral 80 form the sole link between cable 10 and body 11. In more detail, the clamp 40 includes a pair of opposed jaws 41 and 42 which receive, therebetween, the cable 10. A blot 43, passing through the bottom portion of jaw 41 and threadedly received in jaw 42, secures the two jars in place and quite firmly clamps the cable 10. The minor jaw 41 is a rectangular member having a pair of flat planar parallel inner and outer surfaces 44 and 45. The upper end portion of the jaw 41 is bevelled to provide an angled end surface 46 provided with an upwardly and inwardly opening, transversely disposed cylindrical recess 47 of approximately 135°.

The major jaw 42 is a rectangular block having a pair of planar, parallel, inner and outer surfaces 49 and 51. The upper end portion of jaw 42 is provided with a radially extending ledge 52 which overlies the minor jaw 41, as best seen in FIG. 3. The forward lower edge or corner of ledge 52 is bevelled to provide an inclined surface 53 for abutting surface 46. Below the surface 53 and recessed in the inner corner formed by ledge 52 and the upstanding portion of jaw 42 is a cylindrical transversely disposed, inwardly and downwardly opening recess 54. Recess 54 has the same radius of curvature as and is in opposed relationship to recess 47, the two recesses defining a transverse cable receiving opening within which is clamped an increment of cable 10, as shown in FIG. 3, when bolt 43 is tightened to bring inner surfaces 45 and 49 close to each other. As seen in FIG. 3, the recess 54 extends over the center of cable 10, when the cable 10 is installed therein and, hence, regardless of whether or not the minor jaw 41 is firmly clamped in place, the major jaw 42 will be retained on the cable 10 in about its upright position.

The upper portion of the ledge 52 is provided with a flat planar surface 55 having an axially extending upwardly opening or recess or groove 56 of rectangular cross-section which extends throughout the length of ledge 52. A cap or retaining plate 70 is disposed over the upper surface of the ledge 52 and is held in place by four bolts 71, which project through the flat cap 70 and are threadedly received into the ledge 52.

Received within the groove 56 is the flattened or peened proximal end 61 of the torsion bar 60. This proximal end 61 is firmly clamped in place by the cap 70. The torsion bar 60 comprises three, approximately equal length, right angularly or orthogonally disposed components, segments, increments or portions, outwardly of the proximal end 61. In more detail, the first portion of the torsion bar 60 comprises a horizontal, proximal component rod 62 which projects parallel to the cable 10 and axis A, and terminates within the confines of body 11 inwardly of the opening defined by the recesses 16, 18. At its distal end, the horizontal, proximal component rod 62 is bent outwardly to form a right angle and to provide a sidewise prjecting intermediate component bar 63.

The intermediate component bar 63 projects laterally or radially of the proximal component bar 62 and terminates inwardly of the spherical body 11. At its distal end, the intermediate component bar 63 is bent at a right angle to provide a downwardly projecting distal component bar 64, which is perpendicular with respect to both bars 62 and 63. Hence, I have provided three tandemly arranged 90° component bars 62, 63 and 64 which are integrally joined together to form the torsion bar 60, the bars 62, 63 and 64 being disposed in $y$, $x$, and $z$ coordinates, respectively.

The end of the $z$ component bar 64 is flattened or peened to provide a distal end 65 and is received within an appropriate groove 66 of an anchor black 80 which, in turn, is secured to the inside surface of shell 13 by bolts 81 and nuts 82.

The $y$, $x$, and $z$ component bars 62, 63 and 64 of the torsion bar are of approximately equal length and are usually of less length than the radius of body 11 thus positioning the clamping member 40 in approximately the center of the spherical body 11. Therefore, when the suppressor or damper of FIGS. 1–4 is mounted on the cable 10, it remains in a stationary position on the cable until vibrations of the cable 10 cause movement to be transmitted through the torsion bar 60 to the spherical body 11. As illustrated in FIG. 1A, the components provide freedom of movement in 6° or directions. Thus, the $x$ component 63 permits the suppressor or damper to pitch in an arcuate path up and down with respect to the cable 10. The $y$ component 62 permits the suppressor or damper to roll about the axis of cable 10 and the $z$ component 64 permits yawing by the suppressor or damper. Also, the orthogonal disposition of the components or segments 62, 63 and 64 permits axial movement, lateral movement and vertical movement with respect to the cable 10. Hence, the vibrations are transmitted in each degree or direction.

The spherical body 11 is of sufficient diameter that it will reduce the corona losses of high voltage transmission lines. Thus, the device of the present invention is particularly useful in transmission lines wherein the voltage transmitted is in excess of 300,000 volts, and, indeed, is most useful where the potential is in excess of 1,000,000 volts.

It will be apparent to those skilled in the art that the device disclosed in the present embodiment is quite inexpensive to manufacture in that the shells 12 and 13 may be produced of aluminum stampings or produced utilizing progressive dies. Of course, the hemispherical shells 12 and 13 may be produced utilizing a spinning operation for the aluminum. In any event, the shells are quire readily formed and are quite effective both in suppressing corona losses and in suppressing vibrations in cable 10.

While I have specified aluminum as the preferred metal to be used in producing the shells 12 and 13, it will be understood that other conducting metals, such as copper, can be used for producing the shells of the present invention. Furthermore, the clamping member 40 can also be of a conducting metal, such as copper or aluminum. The rod 60, however, is normally made of stainless steel.

The diameter of the spherical body 11 should be a least 10 times the cable diameter so that the device can function as a corona suppressor as well as a vibration suppressor. On the other hand, if only vibration suppressing action is desired, as where the cable does not have a high potential, smaller non-conducting spherical bodies 11 may be utilized quite effectively, When the body 11 is used as a corona suppressor, it is preferably located on the cable within approximately 4' of the point at which the cable 10 is suspended. On the other hand, if the cable 10 is to be utilized for transmitting a low potential, and only vibration suppressing characteristics are deemed desirable in the device of the present invention, or if both corona and vibration suppression is desired, the damper should be located one-half of the minimum wave length from the pole or tower which supports it.

Figure 5:
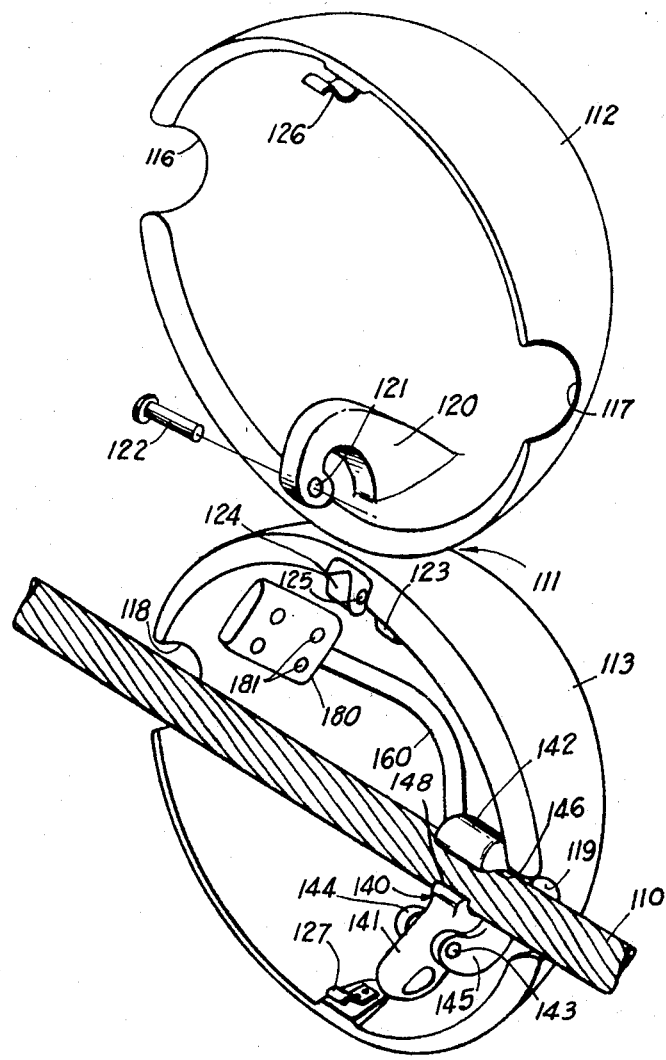
FIG. 5 is an exploded perspective view similar to FIG. 2 but showing a second embodiment of the present invention.
Figure 6:
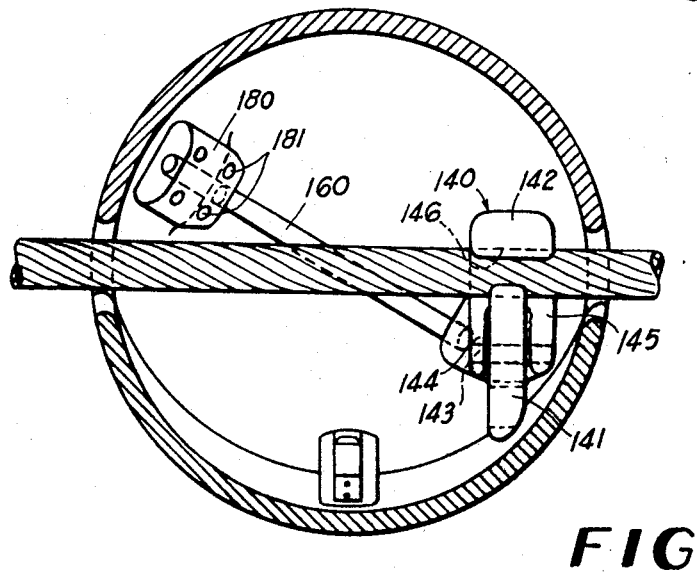
FIG. 6 is a vertical sectional view of the corona and vibration suppressor or reaction damper and cable shown in FIG. 5.

Describing the second embodiment of FIGS. 5 and 6 in detail, it will be understood that the numeral 110 indicates any conventional cable, such as an electrical conductor or other structural cable. The damper body per se is indicated generally at 111 and, in its assembled form, is global or preferably spherical in shape. While this embodiment employs a global or spherical form, it will be understood that the body may be spheroidal ellipsoidal, oval or any other form having relative radii of curvature in all directions. In the second embodiment, it will be seen that the global damper 111 comprises a pair of hemispherical sections or shells 112 and 113, respectively. The hemispherical sections 112 and 113 are each provided with aligned semi-circular apertures 116, 118 and 117, 119. A boss 120 projects upwardly and outwardly from the inner arcuate surface of the section 112, said boss being provided with an aperture 121 which is located outwardly of the terminal portion of the hemispherical section 112. In the assembled condition, the boss 120 projects into the inner cavity of the section 113, whereat the end thereof is received intermediate a pair of lugs 123, 124 — said lugs having apertures 125, 125 which align with the aperture 121 of the boss 120. A pivot pin 122 is telescopically received within the apertures 121 and 125, thereby pivotally connecting sections 112 and 113.

The hemispherical section 112 is further provided, in opposition to the boss 120, with a detent in the form of a locking leaf spring 126. The section 113, on the other hand, is provided with a complementing locking leaf spring 127 also located in opposition to the lugs 123, 124. It is believed to be readily apparent that the leaf springs 126 and 127 so cooperate and overlie that when the hemispherical sections or damper bodies or shells 112, 113 are in the assembled condition, the leaf springs 126 and 127 act to frictionally maintain the sections in closed position. Upon pivotally closing the sections 112 and 113, the leaf springs 126 and 127 snap into the locked position.

For clamping the damper 111 on cable 110, the present embodiment is provided with an over-the-center clamp, denoted generally by numeral 140. The clamp includes a minor jaw 141 and a major jaw 142 pivotally connected together. The major jaw 142 is an inverted L-shaped member having a bifurcated lower end defining a pair of spaced legs 144, 145, provided with aligned transverse holes which receive the pivot pin 143.

The upper ledge portion of the major jaw 142 extends over the cable 110 when installed and is provided at the inner corner with an arcuate cylindrical concaved recess 146 for receiving cable 110, the axis being concentric with the cable 110 and parallel to the axis of pin 143. The upper ledge portion of jaw 142 thus will overlie and hang on cable 110, regardless of the position of minor jaw 141.

The minor jaw 141 is in the form of a lever pivotally carried by its central portion on pin 143 between the legs 144, 145. The lower end portion of jaw 141 forms a handle by means of which the lever or jaw 141 may be swung about pin 143. The upper end portion of jaw 141 has a concaved cylindrical recess 148, the axis of which is parallel to pin 143 and the diameter of which corresponds to and has the same radius of curvature as recess 146, when the upper portion of jaw 141 is moved to its innermost or locked position, as depicted in FIG. 5. In such a position the cable 110 is substantially encompassed and snuggly clamped in place. Since, in swinging inwardly, the upper portion of jaw 141 passes over-the-center and is then arrested by engagement with the inner surface of the major jaw 142, the jaw 141 is urged into its locked position by the residency of the clamped portion of cable 110. The jaw 141, however, may be readily swung to an unlocked position, the upper portion of the jaw 141 moving outwardly to release the cable 110.

Supported by one end embedded in the major jaw 142 is a rigid, yet resilient torsion bar 160 which is arcuate to provide $x, y, z$ segments or increments in $x, y,$ and $z$ directions, the other end of which is embedded in an anchor block 180. The anchor block 180, in turn, is bolted by bolts 181 to the inner surface of shell 113.

The torsion bar 160 is cylindrical in cross-section and is of such a length and so bent that, when the damper 111 is clamped in place on cable 110, the recesses 118, 119 are disposed in coaxial relationship to cable 110, as seen in FIG. 5. Thereafter, shell 112 can be closed around the cable 110.

The bar 160, as seen in FIG. 6, has merging arcuate $x, y,$ and $z$ segments which hold the cable 110 at the center of the damper 111.

In the design of the dampers 11 and 111, they should have a mass or weight which is from one-fourth to three-fourths the weight or mass of one predominate wave length of cable 10 or 110 on which it is to be mounted, i.e., twice the weight of the cable 10 or 110 between two adjacent wave length nodes. The vibrations of the damper 11 or 111 should be out of phase with the vibrations of the cable 10 or 110 and must be resiliently supported thereon so as to react to and suppress or cancel out the vibrations of the cable.

The embodiments of FIGS. 1 through 4 are preferred to the embodiments of FIGS. 5 and 6, due to the improved freedom of movement of the damper 11, particularly in an axial direction with respect to the cable 10.

I claim:

1. A reaction damper for mounting on a cable to suppress vibrations in said cable comprising:
   a. a hollow body provided with a pair of spaced recesses through which said cable passes when the damper is mounted on said cable;
   b. a clamp within said hollow body for clamping an increment of said cable;
   c. a single resilient torsion bar mounted by one end to and extending from said clamp to said body for providing the sole support for said body from said clamp and for transmitting vibrations of said cable via said bar to said body; and
   d. means securing the other end of said torsion bar to the inside surface of said body.

2. The reaction damper as defined in claim 1 wherein said hollow body has a smoothly curved outer surface electrically connected to said cable for reducing corona loss.

3. The reaction damper as defined in claim 1 wherein said hollow body comprises a pair of opposed hemispherical shells.

4. The reaction damper as defined in claim 1 wherein said means includes an anchor block secured to the inside surface of said body and receiving the other end of said bar.

5. The reaction damper as defined in claim 1 wherein said torsion bar has orthogonal segments in the $x, y,$ and $z$ directions to permit six degrees of motion of the damper.

6. The reaction damper as defined in claim 1 wherein said body is composed of two abutting curvilinear shells joined by their edges to form a closed globe, said recesses having sufficiently large apertures through which said cable passes that said cable is in spaced relationship to the edges of said shells defining said apertures and including detent means at the edge portions of said shells securing the same together.

7. The reaction damper as defined in claim 6 wherein said apertures are diametrically opposed holes defined by opposed pairs of open slots in the edge portions of said shells.

8. The reaction damper as defined in claim 1 wherein said torsion bar comprises a proximal component rod, an intermediate component rod and a distal component rod connected respectively by their ends, the free end of said distal component being connected by said means to said body and the free end of said proximal component being connected to said clamp, the component rods lying in different axes.

9. The reaction damper as defined in claim 8 wherein the component rods are in the $y, x$ and $z$ coordinates, respectively.

10. The reaction damper as defined in claim 1 wherein said body is metal and spherical.

11. The reaction damper as claimed in claim 1 wherein said damper is from approximately one-fourth to approximately three-fourths the weight of the one predominant length of the cable on which it will be disposed.

12. The reaction damper as claimed in claim 1 wherein said torsion rod is arcuate and is disposed in a plane intersecting the cable at an acute angle.

13. The reaction damper as claimed in claim 1 wherein said clamp includes a major jaw and a minor jaw having cooperating recesses for receiving therebetween an increment of said cable.

–The reaction damper as claimed in claim 13 wherein said major jaw has a ledge for overlying the increment of cable and its recess is at the lower side of said ledge.

15. The reaction damper as claimed in claim 13 including a bolt joining the two jaws.

16. The reaction damper as claimed in claim 13 wherein said major jaw and minor jaw are pivotally connected together.

* * * * *